Patented Dec. 15, 1942

2,304,981

UNITED STATES PATENT OFFICE 2,304,981

SENSITIZING OF PHOTOGRAPHIC SILVER CHLORIDE, CHLORO - BROMIDE, AND CHLORO-BROMO-IODIDE EMULSIONS

Gustav Wilmanns, Wolfen, Kreis Bitterfeld, Germany, assignor to General Aniline & Film Corporation, New York, N. Y., a corporation of Delaware No Drawing. Application February 14, 1940, Serial No. 318,834. In Germany February 8, 1939

3 Claims. (Cl. 95—7)

This invention relates to sensitizing photographic silver chloride, chloro-bromide and chloro-bromo-iodide emulsions. Many polymethine dyestuffs, the polymethine chain of which is connected with the nitrogen atom of a primary or secondary amine, have been known up to now, but were nearly exclusively used as intermediate products for the synthesis of cyanine dyestuffs. This class of dyestuffs was formerly believed not to possess as a rule special qualities for sensitizing photographic emulsions. In "Zeitschrift für Wissenschaftliche Photographie," Year 1905, volume III, page 6, K. Kieser dealt with the sensitizing qualities of certain dyestuffs of a new dyestuff class. According to his information some of these dyestuffs, for instance the compound obtained from bromo-cyanine-pyridine and aniline of the following constitution

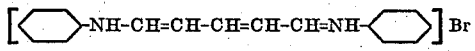

possess weak sensitizing qualities. According to the author the blue-sensitivity of the emulsion is greatly reduced thereby.

It is an object of the invention to provide new and useful sensitizing dyes and silver chloride, chloro-bromide and chloro-bromo-iodide emulsions with improved sensitizing properties.

Further objects will become apparent from the detailed specification following hereinafter.

According to this invention it was found that polymethine dyestuffs of this group sensitize most advantageously photographic emulsions of silver chloride, chloro-bromide or chloro-bromo-iodide, if they contain at least on one side of the methine chain the dihydro-α-methyl-indole ring directly linked to the nitrogen atom. The benzene ring of this dihydro-α-methyl-indole may contain the usual substituents known in cyanine dyestuff chemistry, such as alkyl, alkoxy or amino groups. One or both hydrogen atoms of the

group of the dihydro-α-methyl-indole ring may be substituted by the methyl or ethyl radical.

The other side of the methine chain of these dyestuffs may either contain the dihydro-α-methyl-indole ring, linked in the same way directly to the nitrogen atom, or be connected with a nitrogenous heterocyclic radical without direct linkage to the nitrogen atom. As nitrogenous heterocyclic radicals all heterocyclic ring systems known in cyanine dyestuff chemistry are useful, which for instance may contain the following radicals: thiazole, selenazole, thiazoline, selenazoline, oxazole, oxazoline, quinoline, quinaldine, lepidine, indoline, benzimidazole, rhodanine. These ring systems may be substituted in the usual manner. The azoles for instance may be substituted with the phenyl-, phenylene-, naphthylene radical. The dyestuffs are of the following three formulas:

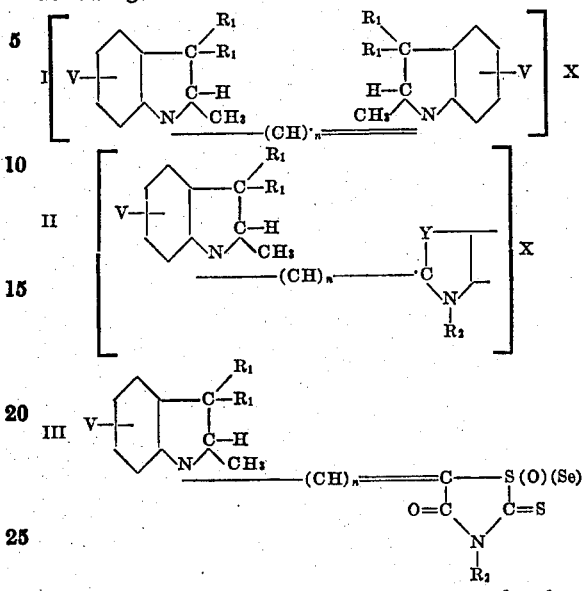

In these formulas $n$ means an odd number between 1 and 9 (Formula I and III), an even number between 2 and 6 (Formula II). In all formulas $R_1$ means H, $CH_3$ or $C_2H_5$,
$R_2$ means alkyl,
X means any acid radical,
Y means O, S, Se, $-CH=CH-$,

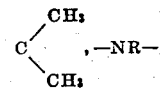

V means a substituent usual in cyanine dyestuff chemistry located on a carbon atom in any position of the benzene ring, for instance an alkyl, alkoxy-, amino- or modified amino group.

The dyestuffs are prepared according to known processes or by methods analogous to known processes. The dyestuffs according to Formula I are prepared by condensation of the dihydro-α-methyl-indole with propargyl-aldehyde-acetal or with dinitro-phenyl-pyridinium-chloride. The dyestuffs according to Formula II are prepared either by condensation of dyestuffs described in Formula I with the 2-alkyl-quaternary salts of the respective nitrogenous hetero bases in the presence of the usual condensing agents or by transforming the dyestuffs of Formula I into the ω-aldehydes and connecting them with the 2-alkyl-quaternary salts of the heterocyclic bases. The dyestuffs according to Formula III are prepared by condensation of the respective ω-aldehydes with rhodanines or their equivalents.

The dyestuffs are partly described in U. S. patent application Ser. No. 172,775, filed November 4, 1937, and also in German Patents Nos. 218,904 and 218,616.

The dyestuffs are added in the usual manner in normal concentrations directly to the emulsion or applied in a bathing process. They may be mixed with each other or applied in mixture with other known cyanine dyestuffs.

The present invention is described in the following examples:

Example I

A dyestuff of the following formula has an absorption maximum at about 430 mμ and a sensitizing maximum (AgCl) at 460 mμ.

The product is prepared according to the method of Claisen (Ber. 36,3667), from propargylaldehyde acetal, dihydro-α-methylindole, hydrochloric acid.

Example II

A dyestuff of the following formula has an absorption maximum at 525 mμ and a sensitizing maximum (AgCl) at 555 mμ.

Preparation: 2.6 grams dihydro-α-methylindole+2,8 grams dinitrophenyl-pyridinium-chloride+10 cc. alcohol are boiled for 5 minutes. Intense red-coloring appears. Then 1 cc. 70% perchloric acid in 5 cc. alcohol (ice-cold) is added and the reaction product cooled to room-temperature. After scratching with a glass rod formation of crystals begins. At low temperature the product is sucked off and washed with alcohol and ether. It is a red powder.

Example III

A dyestuff of the following formula has an absorption maximum at 535 mμ in methanol and a sensitizing maximum (AgCl) at 565 mμ.

The product is prepared from dihydro-α-methylindole-N-propenal and 2-methyl-benzthiazole-ethyl-iodide with pyridine and acetic anhydride.

Example IV

A dye of the following formula has an absorption maximum in methanol at 620 mμ and a sensitizing maximum (AgCl) at 650 mμ.

The product is prepared from dihydro-α-methylindole-N-pentadienal and 2-methyl-benzthiazole-ethyl-iodide with pyridine and acetic anhydride.

Example V

A dyestuff of the following formula has an absorption maximum in methanol at 530 mμ and a sensitizing maximum (AgCl) at 560 mμ.

The product is prepared from dihydro-α-methylindole-N-propenal and 2-methyl-5-diethyl-aminobenzoxazole-ethyl-iodide with pyridine and acetic anhydride.

Example VI

A dyestuff of the following formula has an absorption maximum in methanol at 485 mμ and a sensitizing maximum (AgCl) at 515 mμ.

The product is prepared from dihydro-α-methylindole-N-propenal and 2-methyl-thiazoline-methyl-iodide with pyridine and acetic anhydride.

Example VII

A dye of the following formula has an absorption maximum in methanol at 470 mμ and a sensitizing maximum (AgCl) at 520 mμ.

The product is prepared from dihydro-α-methylindole-N-propenal and N-ethyl-keto-thioketo-oxazolidine (Journ. prakt. Chemie, Volume 99,762, Ahlquist) with pyridine and acetic anhydride.

Example VIII

A dyestuff of the following formula has an absorption maximum in methanol at 500 mμ and a sensitizing maximum (AgCl) at 550 mμ.

The product is prepared from dihydro-α-methylindole-N-propenal and N-ethylrhodanine with pyridine and acetic anhydride.

Example IX

A dye of the following formula

[structure]

has an absorption maximum in methanol at 570 mμ and a sensitizing maximum (AgCl) at 600 mμ.

The product is prepared from the dyestuff of Example VIII by forming the quaternary salt with dimethylsulfate and condensing it with 2-methyl-benzthiazole-ethyl-iodide according to U. S. Patent application Ser. No. 237,474, filed October 28, 1938.

Example X

A dye of the following formula

[structure]

has an absorption maximum in $CH_3OH$ at 535 mμ and a sensitizing maximum at about 570 mμ.

The product is prepared from dihydro-α-methylindole-N-propenal and hydroxythionaphthene by condensing it with acetic anhydride.

Example XI

A dyestuff of the following formula

[structure]

has an absorption maximum in methanol at about 500 mμ and a sensitizing maximum (AgCl) at 535 mμ.

The product is prepared from dihydro-α-methylindole-N-propenal and 2-methyl-benzimidazole-ethyl-iodide with pyridine and piperidine.

Example XII

A dyestuff of the following formula

[structure]

has an absorption maximum in methanol at about 490 mμ and a sensitizing maximum (AgCl) at 520 mμ.

The product is prepared from dihydro-α-methylindole-N-propenal and p-phenylene-diamine +HCl.

What I claim is:

1. A photographic material comprising a support and at least one silver halide emulsion layer cast thereon and containing silver chloride, said layer containing a polymethine dyestuff having on one side of the polymethine chain a radical of the following structure

[structure]

and on the other side of said chain a radical of the group consisting of

[structures]

and

[structure]

wherein

A means a member of the group consisting of $$-CH_3$$
$$-CH_3$$

and a phenylene, $R_1$ means a member of the group consisting of hydrogen and alkyl, $R_2$ means alkyl, V means a member of the group consisting of an alkyl, alkoxy, amino, and a modified amino radical, as a substituent at any place of the benzene nucleus, X means acid radical, Y means a member of the group consisting of oxygen, sulfur, selenium, $CH=CH$, $C(CH_3)_2$, and $NR_2$, Z means a member of the group consisting of oxygen, sulfur and selenium.

2. A photographic material comprising a support and at least one silver chloride emulsion layer cast thereon, said layer containing a polymethine dyestuff as defined in claim 1.

3. A photographic material comprising a support and at least one silver halide emulsion layer cast thereon and containing silver chloride, said layer containing a dyestuff of the following formula:

[structure]

GUSTAV WILMANNS.